Patented May 1, 1934

1,957,262

UNITED STATES PATENT OFFICE 1,957,262

GAS PURIFICATION

Herbert A. Gollmar, West Caldwell, N. J., assignor to The Koppers Company of Delaware, a corporation of Delaware No Drawing. Application February 23, 1929, Serial No. 342,317

3 Claims. (Cl. 23—225)

My invention relates to the purification of gases such as coal gas, water gas, air, or the like, from hydrogen sulphide and analogous impurities, including such analogous acidic impurities as hydrogen cyanide.

This invention bears a close relation to that described and claimed in my U. S. Patent No. 1,719,762, issued July 2, 1929, and of which this application is a continuation-in-part.

An object of my invention is to provide an improved process of purifying gas in which sulphur removed from a gas in the form of such an impurity as hydrogen sulphide is largely recovered in elemental form, and whereby an essential element of the purifying medium may be derived from the gas itself, or supplied in the form of a relatively inexpensive substance.

My invention has for further objects such other operative advantages and results as may hereinafter be found to obtain.

My invention contemplates a treatment of the gas to be purified with a solution containing ammonia and arsenic, preferably in the form of a thio-arsenic compound of ammonia; for example, a thio-compound of ammonia and an acid of arsenic, such as ammonium thioarsenate. Such a solution may be, and preferably is, recirculated through a cycle comprising an absorption stage in which it is brought into contact with the gas for purification thereof from impurities comprising sulphur compounds and analogous impurities, and an actification stage in which the liquid is regenerated for further use by treatment with an oxygen-containing gas and the greater portion of the sulphur removed from the gas in the form of hydrogen sulphide or the like is recovered in elemental form and removed.

I have found that a suitable solution may be prepared by dissolving an arsenic compound, such as arsenious oxide, in water and subjecting it to contact with the gas to be purified (i. e., containing hydrogen sulphide), in the presence of ammonia. No preliminary stage is required. The solution is merely recirculated through the usual cycle of apparatus employed in processes of the "sulphur recovery" type, and purification of the gas and regeneration of the solution are effected in due course.

The ammonia may be added from an outside source either as such or in the form of a readily decomposable compound, or may be derived from the gas itself. Inasmuch as fuel gases generally contain ammonia, when the gas to be purified is of this character, the latter procedure is preferred.

Under ordinary conditions, I prefer to use a solution containing the equivalent of about 1% of $As_2O_3$ in the form of a thio-arsenic compound of ammonia.

I have found that excess quantities of ammonia are to be avoided, and in general that the ratio of ($NH_4$) radicles to (As) atoms in the thio-arsenic compound should not exceed 3:1. However, enough ammonia must be supplied to account for mechanical losses and for the formation of side compounds, such as ammonium thiocyanate and ammonium thiosulphate, which are formed to a greater or less extent, depending somewhat on various conditions of temperature, aeration, and the like.

While ammonium thiosulphate may be formed to some extent, the greater portion of the sulphur impurities may be caused to be converted to free sulphur by limiting the amount of ammonia present in the system. However, the amount of ammonium thiocyanate which is formed bears a direct relation to the amount of hydrogen cyanide present in the gases being purified, as this impurity is substantially entirely converted into the form of ammonium thiocyanate.

My process is performed in the usual apparatus employed in other gas purification processes of the so-called sulphur recovery type, and comprises an absorber, an actifier, and means for recirculating the absorbent solution through a cycle comprising the same. As is true of other sulphur recovery processes, the actifier should be of a type capable of promoting the flotation and removal of the sulphur liberated in this stage.

Where conditions are such that ammonia is liberated in the actification stage, the actifier employed should be of a closed type. For example, a Feld washer may be employed for actification in this instance, but should preferably be supplemented by means for recovering the liberated sulphur.

My invention is not limited to the specific example or examples given hereinabove by way of illustration, but may be variously embodied and practiced within the scope of the claims hereinafter made.

I claim as my invention:

1. The process of purifying a gas containing ammonia by removing therefrom acidic impurities comprising sulphur compounds, which comprises washing the gas with a solution containing arsenic in a form capable of reacting with said ammonia and said sulphur impurities to form a thio-compound of ammonia and arsenic.

2. The process of purifying a gas containing ammonia by removing therefrom acidic impurities, which comprises washing the ammoniacal gas with a solution prepared by dissolving a compound of arsenic in water.

3. The process of purifying a gas containing ammonia by removing therefrom acidic impurities, which comprises washing the ammoniacal gas with a solution prepared by dissolving arsenious oxide in water.

HERBERT A. GOLLMAR.